US008824346B2

(12) United States Patent
Woo et al.

(10) Patent No.: US 8,824,346 B2
(45) Date of Patent: *Sep. 2, 2014

(54) REMOTE WAKEUP OF APPLICATION PROCESSOR OF MOBILE DEVICE

(75) Inventors: Sungho Woo, Gyeonggi-Do (KR); Jaeyoung Choi, Seoul (KR); Hoon Jo, Gyeonggi-Do (KR); Hyeonchang Choi, Gyeonggi-Do (KR); Jongseok Park, Gyeonggi-Do (KR); Okhyun Jeong, Seoul (KR); Giwon Kang, Seoul (KR); Hong Jo Shim, Seoul (KR); Jungseok Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 288 days.

This patent is subject to a terminal disclaimer.

(21) Appl. No.: 13/042,380

(22) Filed: Mar. 7, 2011

(65) Prior Publication Data
US 2012/0213134 A1   Aug. 23, 2012

Related U.S. Application Data

(60) Provisional application No. 61/445,975, filed on Feb. 23, 2011.

(51) Int. Cl.
G08C 17/00 (2006.01)
G06F 1/32 (2006.01)
H02J 7/02 (2006.01)

(52) U.S. Cl.
CPC ............ *G06F 1/3287* (2013.01); *G06F 1/3209* (2013.01); *H02J 7/025* (2013.01)
USPC .......................................... 370/311

(58) Field of Classification Search
CPC ....... G06F 1/3209; G06F 1/3287; H02J 7/025
See application file for complete search history.

(56) References Cited

U.S. PATENT DOCUMENTS 7,208,916 B1 * 4/2007 Boatwright et al. .......... 320/150
2004/0121802 A1    6/2004 Kim et al.
(Continued)

FOREIGN PATENT DOCUMENTS

CN       101668350      3/2010
CN        1698339       6/2010

OTHER PUBLICATIONS

U.S. Appl. No. 13/233,977, Office Action dated Jan. 16, 2014, 24 pages.

(Continued)

*Primary Examiner* — Jae Y Lee
(74) *Attorney, Agent, or Firm* — Lee, Hong, Degerman, Kang & Waimey

(57) ABSTRACT

A system, circuit, and device for waking up an application processor (AP) of the mobile device are disclosed. The system includes a low power personal area network (PAN) module configured to communicate with an external device for establishing a connection with the external device. The system also includes a controller for the low power PAN module configured to process a connection request signal from the external device and to wake up the AP of the mobile device in response to an AP on request signal from the external device when the connection request signal from the external device is verified as valid, where the controller is supplied with quiescent current from a battery of the mobile device prior to the wake up of the AP.

19 Claims, 6 Drawing Sheets

(56) References Cited

U.S. PATENT DOCUMENTS

| | | |
|---|---|---|
| 2005/0138138 A1* | 6/2005 | Jelinek et al. .............. 709/217 |
| 2006/0112287 A1 | 5/2006 | Paljug |
| 2007/0205872 A1 | 9/2007 | Kim et al. |
| 2008/0067995 A1* | 3/2008 | Chua-Eoan et al. ......... 323/284 |
| 2010/0022217 A1* | 1/2010 | Ketari ........................ 455/411 |
| 2010/0039284 A1 | 2/2010 | Hall et al. |
| 2010/0205467 A1 | 8/2010 | Park |
| 2010/0304761 A1 | 12/2010 | Seibert et al. |
| 2011/0021142 A1* | 1/2011 | Desai et al. ................ 455/41.2 |
| 2011/0086615 A1 | 4/2011 | Golder |
| 2011/0148349 A1 | 6/2011 | Kim et al. |
| 2012/0303476 A1 | 11/2012 | Krzyzanowski et al. |
| 2012/0315845 A1 | 12/2012 | Buczek |

OTHER PUBLICATIONS

U.S. Appl. No. 13/277,056, Office Action dated Oct. 18, 2013, 15 pages.

The State Intellectual Property Office of the People's Republic of China Application Serial No. 201110187018.3, Office Action dated Nov. 11, 2013, 9 pages.

U.S. Appl. No. 13/277,056, Final Office Action dated May 1, 2014, 19 pages.

* cited by examiner

US 8,824,346 B2

REMOTE WAKEUP OF APPLICATION PROCESSOR OF MOBILE DEVICE

CROSS-REFERENCE TO RELATED APPLICATIONS

Pursuant to 35 U.S.C. §119(e), this application claims the benefit of U.S. Provisional Patent Application Ser. No. 61/445,975, filed on Feb. 23, 2011, the contents of which are hereby incorporated by reference herein in their entirety.

BACKGROUND OF THE INVENTION

1. Technical Field

Embodiments of the disclosure generally relate to the field of electronics, and more particularly to control systems, circuits, and devices.

2. Background

A mobile device is a pocket-sized computing device, typically having a display screen with touch input and/or a miniature keyboard. Some of the types of the mobile device include a mobile phone, personal digital assistant (PDA), a tablet PC, a laptop, etc. As today's mobile devices become ever more dependant on their software, as in the case of smart phones, software upgrade to fix bugs or enhance the features of the mobile devices is becoming increasingly frequent. For example, companies are offering new versions of the smart phones twice year, where the new versions may have new and/or upgrade software and/or hardware features. The upgraded smart phones may be packaged and stored as an inventory until they are shipped out and sold to the consumers.

However, while the smart phones are in stock, a bug or flaw may be found with a certain software feature of the smart phones, such as the OS of the smart phones. In that case, the companies may manually take out the smart phones from their package, power up the application processor (AP) of each mobile phone, and then download a bug-free OS to each mobile phone.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

Systems, circuits, and devices for remotely waking up an application processor of a mobile device are disclosed. In one aspect, a system of a mobile device for waking up an application processor (AP) of the mobile device includes a low power personal area network (PAN) module configured to communicate with an external device for establishing a connection with the external device. The system also includes a controller for the low power PAN module configured to process a connection request signal from the external device and to wake up the AP of the mobile device in response to an AP on request signal from the external device when the connection request signal from the external device is verified as valid, where the controller is supplied with quiescent current from a battery of the mobile device prior to the wake up of the AP.

In another aspect, a mobile device includes a battery, an application processor (AP), and a low power personal area network (PAN) module configured to communicate with an external device for establishing a connection with the external device. The mobile device further includes a controller for the low power PAN module configured to process a connection request signal from the external device and to wake up the AP in response to an AP on request signal from the external device when the connection request signal is verified as valid, where the controller is supplied with quiescent current from the battery prior to the wake up of the AP.

In yet another aspect, a system includes a server and multiple mobile devices. Each of the multiple mobile devices includes a battery, an application processor (AP), and a low power personal area network (PAN) module configured to communicate with the server for establishing a connection with the server. In addition, each of the multiple mobile devices includes a controller for the low power PAN module configured to process a connection request signal from the server and to wake up the AP of each mobile device in response to an AP on request signal from the server when the connection request signal from the server is verified as valid, where the controller is supplied with quiescent current from the battery of each mobile device prior to the wake up of the AP. Further, the AP may awaken a Wi-Fi module of each mobile device to download an OS image from the server via a Wi-Fi module of the server and the Wi-Fi module of the mobile device.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Figure 1:
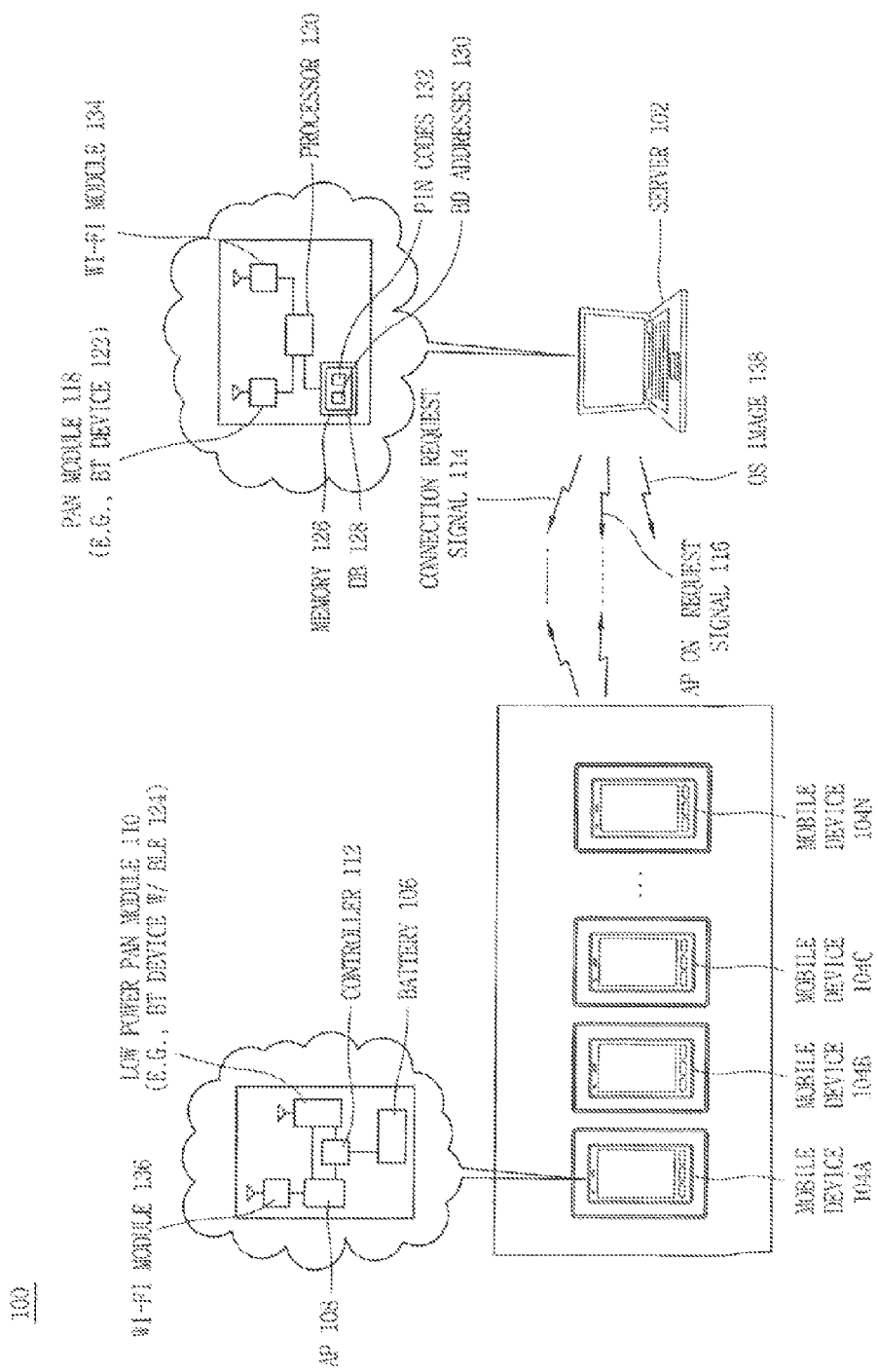
FIG. 1 illustrates an exemplary system for remotely waking up an application processor of a mobile device, according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system are disclosed that remotely wake up an application processor (AP) of a mobile device. According to embodiments of this disclosure, a system of a mobile device for waking up an AP of a mobile device includes a low power personal area network (PAN) module and a controller of the low power PAN module, where the system is supported by a battery of the mobile device for several months. The long battery life of the mobile terminal may be possible by maintaining the system for waking up the AP of the mobile device in standby mode, where minimal amount of power is drawn from the battery during the standby mode. While the system is in the standby mode, the controller of the system may monitor a signal from an external device so that it can turn on the AP in response to an AP on request signal when the external device is verified.

The mobile device with the system for waking up the AP may process the AP on request signal to turn on the AP. Then, with its AP on, the mobile device may carry out a task commanded by the external device through more powerful communication means available in the mobile device, such as wireless LAN module (e.g., a Wi-Fi module). That is, according to the embodiments of this disclosure, the monitoring and activating the AP of the mobile device may be performed using a low power PAN module, such as a Bluetooth (BT) Device with Bluetooth Low Energy (BLE) feature, so that the battery installed on the mobile device which is in package can last longer.

However, once the AP of the mobile device is turned on, the AP can activate more powerful communication means, such as the Wi-Fi module available on the mobile device, to process data or files from the external device. In one example, an OS image may be downloaded to the mobile device to fix a bug or flaw in the existing OS using the Wi-Fi module of the mobile device. Once the download is completed, the AP of the mobile device can be placed back to sleep, and the system for waking up the AP may remain in the standby mode until the battery is run out.

Further, APs of multiple mobile devices may be remotely turned on to perform an application or to carry out a certain task, such as the OS upgrade, based on the method, system or device described above. That is, the external device (e.g., a server in a form of a desktop, a laptop, a mobile device, etc.) may be used to connect or pair up with each of the mobile devices and then turn on the AP of each mobile device. Once the AP of each mobile device is turned on and the Wi-Fi module of each mobile device is activated, then the OS upgrade of each mobile device can be automatically and expeditiously performed using the Wi-Fi technology. Thus, the embodiments include more versatile, efficient methods, systems, and devices for remotely controlling mobile devices.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates an exemplary system 100 for remotely waking up application processors of mobile devices 104A-N, according to one embodiment. In one embodiment, the system 100 comprises a server 102 and the multiple mobile devices 104A-N. It is appreciated that the server 102 may be a work station, a desktop, a laptop, a tablet PC, etc. which functions as the master device. It is further appreciated that each of the multiple mobile devices 104A-N may function as a slave device. Each of the multiple mobile devices 104A-N comprises a battery, an application processor (AP), a low power personal area network (PAN) module, and a controller for the low power PAN module. For example, the mobile device 104A comprises a battery 106, an AP 108, and a low power personal area network (PAN) module 110 configured to communicate with the server 102 for establishing a connection with the server 102. It is appreciated that the low power PAN module may be a wireless IrDA, Bluetooth, UWB, Z-Wave and ZigBee which is designed to consume minimal amount of power. For example, a BT device with Bluetooth low energy (BLE) feature may consume a fraction (e.g., 1 to 5 percent) of the power of conventional BT device. It is further appreciated that the AP or application processor may be a system on chip (SoC) which include one or more of core (CPU), memory, display system/controller, multimedia en/decoding codec, 2D/3D accelerator engine, ISP (Image Signal Processor), camera, audio, modem, various high & low speed serial/parallel connectivity interface, etc.

The mobile device 104A further comprises a controller 112 for the low power PAN module 110 configured to process a connection request signal 114 from the server 102 and to wake up the AP 108 of the mobile device 104A in response to an AP on request signal 116 from the server 102 when the connection request signal 114 from the server 102 is verified as valid. The controller 112 is supplied with quiescent or insignificant current from the battery 106 of the mobile device 104A prior to the wake up of the AP 108. It is appreciated that each of the remaining mobile devices 104B-N comprises the same or equivalent features described in regard to the mobile device 104A.

In one embodiment, the server 102 comprises a PAN module 118 and a processor 120 configured to generate the connection request signal 114 and the AP on request signal 116. Alternatively, the PAN module 118 may be implemented as a dongle that can be freely attached or detached based on the need. In one exemplary implementation, the PAN module 118 of the server 102 comprises a Bluetooth (BT) device 122, and the low power PAN module 110 of the mobile device 104A comprises a BT device with BLE feature 124. The server 102 further comprises a memory 126 which stores a database (DB) 128 comprising addresses of Bluetooth devices with BLE feature (BD addresses) 130 for the mobile devices 104A-N and personal identification number (PIN) codes 132 designated for the mobile devices 104A-N, respectively. It is appreciated that the BD addresses 130 may store the network addresses of BT enabled devices, such as the devices 104A-N. The BD addresses 130 may be a unique number (e.g., in 48 bits) used to identify a particular device during operations such as connecting to, pairing with, or activating the device.

In one embodiment, a pairing of the server 102 and each of the mobile devices 104A-N is performed based on the BD addresses 130 and the PIN codes 132 designated for the mobile devices 104A-N. In one exemplary implementation, each of the PIN codes 132 may be a 4-digit personal ID code based on the serial number of the mobile device and/or the version of OS to be downloaded to the mobile device. The server 102 is configured to request the connection with the server 102 to each mobile device (e.g., the mobile device 104A) according to a particular profile dictated by the server 102, and each mobile device is configured to accept the request. In addition, the server 102 and each mobile device are configured to implement a protocol for the wake up of a corresponding AP (e.g., the AP 108).

Further, each mobile device is configured to perform the wake up of its AP upon receipt of its AP on request signal. The controller of each mobile device is configured to measure a level of its battery upon receipt of the AP on request signal, and the wake up of the AP is performed when the level of the battery is higher than a threshold level. For example, the controller 112 of the mobile device 104A is configured to measure the level of the battery 106 upon receipt of the AP on request signal 116, and the wake up of the AP 108 is performed when the level of the battery 106 is higher than a threshold level. In case the level of the battery 106 is lower than the threshold level, the mobile device may forward its status report to the server 102 without turning on the AP 108.

Further, the server 102 further comprises a Wi-Fi module 134, and each mobile device comprises a Wi-Fi module. For example, the mobile device 104A comprises a Wi-Fi module 136. In one embodiment, a download of an OS image 138 stored in the server 102 to each mobile device is performed via the Wi-Fi module 134 of the server 102 and the Wi-Fi module of each mobile device. In one exemplary implementation, the controller for the low power PAN module may be disabled when the download of the OS image is completed and the subject mobile device is in use.

Although the system 100 of FIG. 1 is described in terms of single server and each mobile device, it is appreciated that the process of connecting the mobile device 104A and performing a task remotely commanded by the server 102 may be simultaneously or serially performed for all of the mobile devices 104A-N. For example, if the low power PAN module in each mobile device is a BT device with BLE feature, the server 102, which is the master device, may form a piconet with seven slave devices, such as seven BT devices with BLE feature. Accordingly, the server 102 and the seven BT devices may communicate in serial or parallel to connect and wake up a corresponding AP of each mobile device. Alternatively, more than eight devices may be connected based on a scatternet so that the communication between the server 102 and the mobile devices can be faster.

Figure 2:
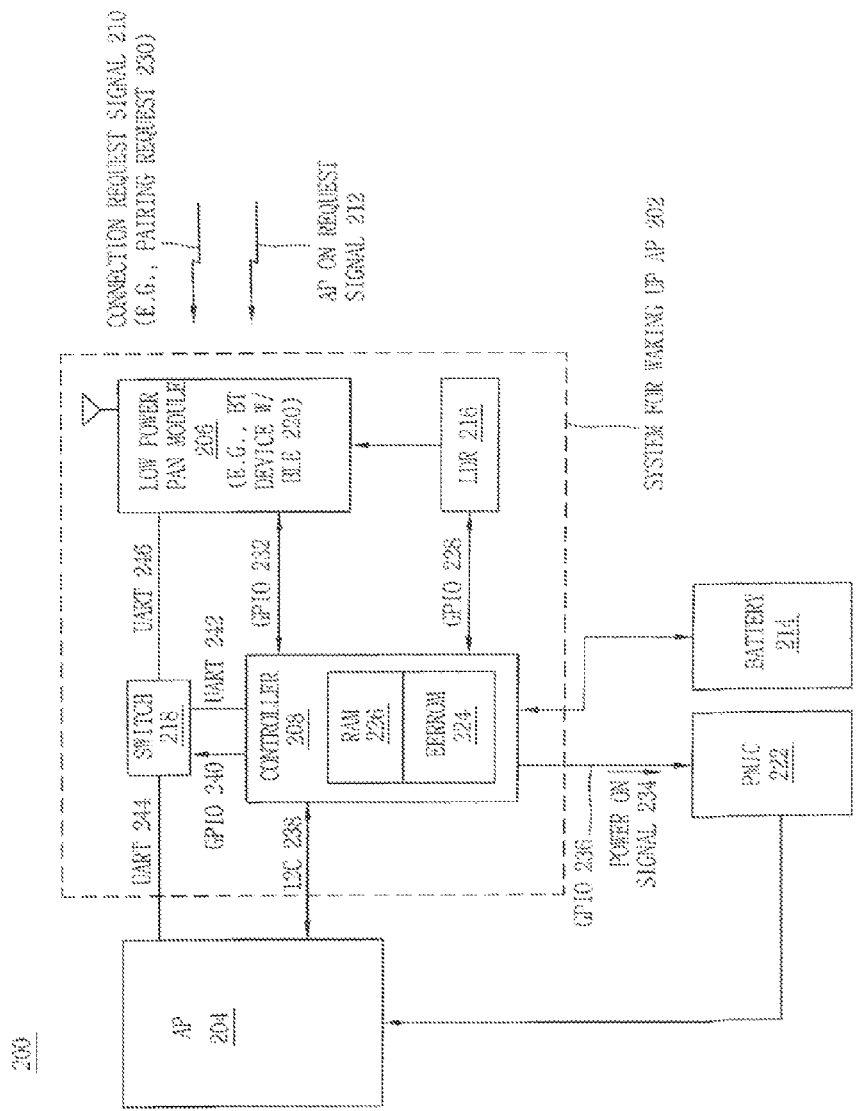
FIG. 2 illustrates an exemplary system of a mobile device for waking up an application processor of the mobile device, according to one embodiment.

FIG. 2 illustrates an exemplary system 202 of a mobile device 200 for waking up an application processor (AP) 204 of the mobile device 200, according to one embodiment. In one embodiment, the system 202 comprises a low power personal area network (PAN) module 206 configured to communicate with an external device for establishing a connection with the external device. The system 202 further comprises a controller 208 for the low power PAN module 206 configured to process a connection request signal 210 from the external device and to wake up the AP 204 of the mobile device 200 in response to an AP on request signal 212 from the external device when the connection request signal 210 from the external device is verified as valid, where the controller 208 is supplied with quiescent current from a battery 214 of the mobile device 200 prior to the wake up of the AP 204.

The system 202 also comprises a low dropout regulator (LDR) 216 configured to maintain a voltage supplied to the low power PAN module 206. The system 202 further comprises a switch 218 configured to open a connection between the AP 204 and the low power PAN module 206 prior to the wake up of the AP 204 and to close the connection upon the wake up of the AP 204. In one exemplary implementation, the low power PAN module 206 comprises a Bluetooth device with BLE feature 220.

In one embodiment, the mobile device 200 comprises the battery 214, the AP 204, the low power PAN module 206, and the controller 208. The mobile device 200 further comprises the LDR 216, the switch 218, and a power management integrated circuit (PMIC) 222 configured to control a power supplied to the AP 204. It is appreciated that the mobile device 200 is an exemplary implementation of any one of the mobile devices 104A-N.

In one embodiment, the controller 208 is initialized when the battery 214 is installed to the mobile device 200. For example, during the initialization, the setting for general purpose input/outputs (GPIOs) of the controller 208 and the profile of the BT device with BLE feature 220 stored in EEPROM 224 of the controller 208 may be loaded to a RAM 226 of the controller 208. Further, the controller 208 is configured to perform a power on sequence of the Bluetooth device with BLE feature 220 by controlling the LDR 216 via a general purpose input/output (GPIO) 228 of the controller 208. The controller 208 is also configured to perform a pairing with the external device based on a pairing request 230 from the external device forwarded via a GPIO 232 of the controller 208.

The controller 208 is further configured to forward a power on signal 234 via a GPIO 236 to the PMIC 222 to wake up the AP 204 in response to the AP on request signal 212 from the external device. Moreover, the controller 208 is configured to operate the switch 218 (e.g., using GPIO 240 and/or UART 242) to transfer a control of the Bluetooth device with BLE feature 220 to the AP 204. Subsequently, data is communicated directly between the AP 204 and the BT device with BLE feature 220. In one exemplary implementation, the controller 208 may be physically separate from the low power PAN module 206. In another exemplary implementation, the controller 208 may be a part of the low power PAN module 206 together with the LDR 216 and the switch 218. In yet another exemplary implementation, the controller 208 may be a part of the AP 204, yet islanded within the AP 204 so that the controller 208 can be operated without waking up the AP 204 prior to the receipt of the AP on request 212 from the external device.

Figure 3:
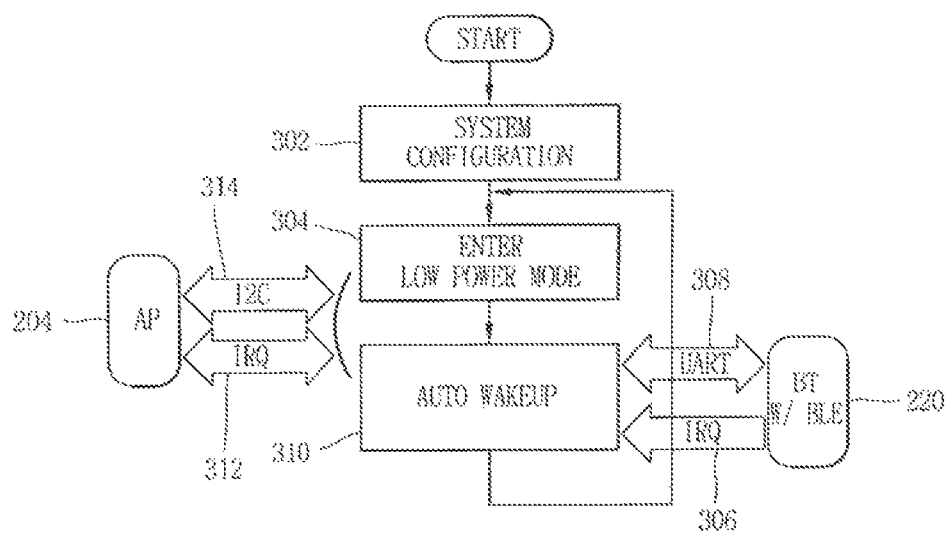
FIG. 3 illustrates an exemplary flow graph of the system of the mobile device in FIG. 2, according one embodiment.

FIG. 3 illustrates an exemplary flow graph 300 of the system of the mobile device 200 in FIG. 2, according one embodiment. In operation 302, configurations of the system for waking up AP 202 are performed. It is appreciated that the system for waking up AP 202 may be a stand alone device (e.g., in a chip) or a part of the BT device with BLE feature 220 (e.g., or any other type of a low power PAN module). In addition, in operation 304, the system for waking up AP 202 enters a low power mode, where in one exemplary implementation, only 300 uA or less amount of current is drawn by the system for waking up AP 202. During the low power mode, the controller 208 of the system for waking up AP 202 monitors a signal from the BT device with BLE feature 220.

In operation 306, when an interrupt request (IRQ 306) is received from the BT with BLE feature 220, the controller 208 automatically wakes up the AP 204 via an interrupt request (IRQ 312) when authentication data from the BT with BLE feature 220 (e.g., as a part of a pairing request signal) is verified to be valid and an AP on request signal is received and acknowledged by the controller 208. Then, the controller 208 communicates with the AP 204 via an inter-integrated circuit (I2C 314) to transfer its control over the BT with BLE feature 220 to the AP 204.

Figure 4:
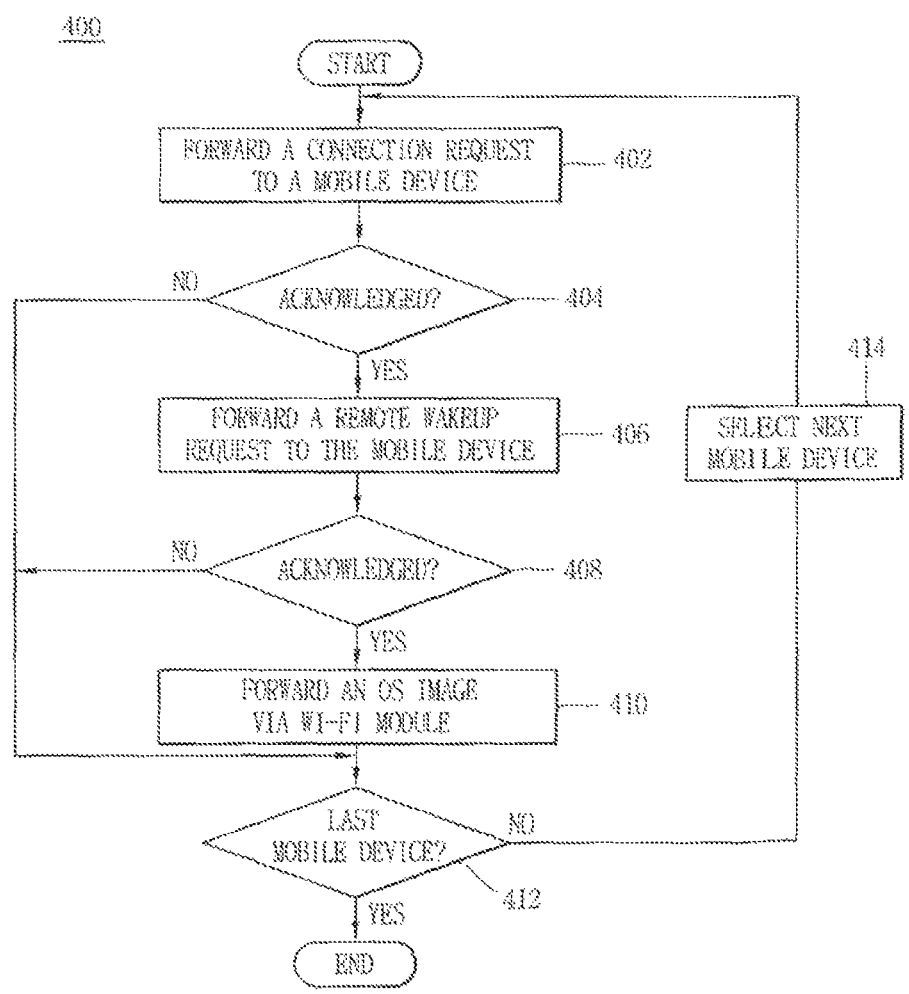
FIG. 4 illustrates a process flow chart of an exemplary method of a server for remotely waking up an application processor of a mobile device, according to one embodiment.

FIG. 4 illustrates a process flow chart 400 of an exemplary method of a server for remotely waking up an application processor of a mobile device, according to one embodiment. In keeping with the previous examples, particular components described with respect to FIG. 1 are referenced as performing the process in FIG. 4. It should be noted that the components that are referred to as performing the process are for illustrative purposes only. In some implementations, other components, or a different combination of components within a system, may instead perform the process in FIG. 4.

In operation 402, as illustrated in FIG. 1, the connection request signal 114 (e.g., a pairing request) is forwarded to the mobile device 104A via the PAN module 118 (e.g., the BT device 122). If the connection request signal 114 (e.g., a pairing request signal) is not acknowledged by the mobile device 104A in operation 404, the connection request signal 114 is sent to next mobile device (e.g., the mobile device 104B) unless the present mobile device is the last one. If the connection request signal 114 (e.g., the pairing request signal) is acknowledged by the mobile device 104A in operation 404, the server 102 forwards a remote wakeup request signal (e.g., the AP on request signal 116) to the mobile device 104A in operation 406. If the remote wakeup request signal is not acknowledged by the mobile device 104A in operation 408, the remote wakeup request signal is sent to next mobile device (e.g., the mobile device 104B) unless the present mobile device is the last one.

If the remote wakeup request signal is acknowledged by the mobile device 104A in operation 408, the OS image 138 is forwarded to the mobile device 104A using the Wi-Fi module 134. If the present mobile device is determined as the last mobile device (e.g., the mobile device 104N), the operation of waking up each mobile device and performing the download of the OS image 138 are brought to end. Otherwise, operations 402 through 410 are repeated once next mobile device is selected in operation 414.

It is appreciated that the methods disclosed in FIG. 4 may be implemented in a form of a machine-readable medium embodying a set of instructions that, when executed by a machine, cause the machine to perform any of the operations disclosed herein.

Figure 5:
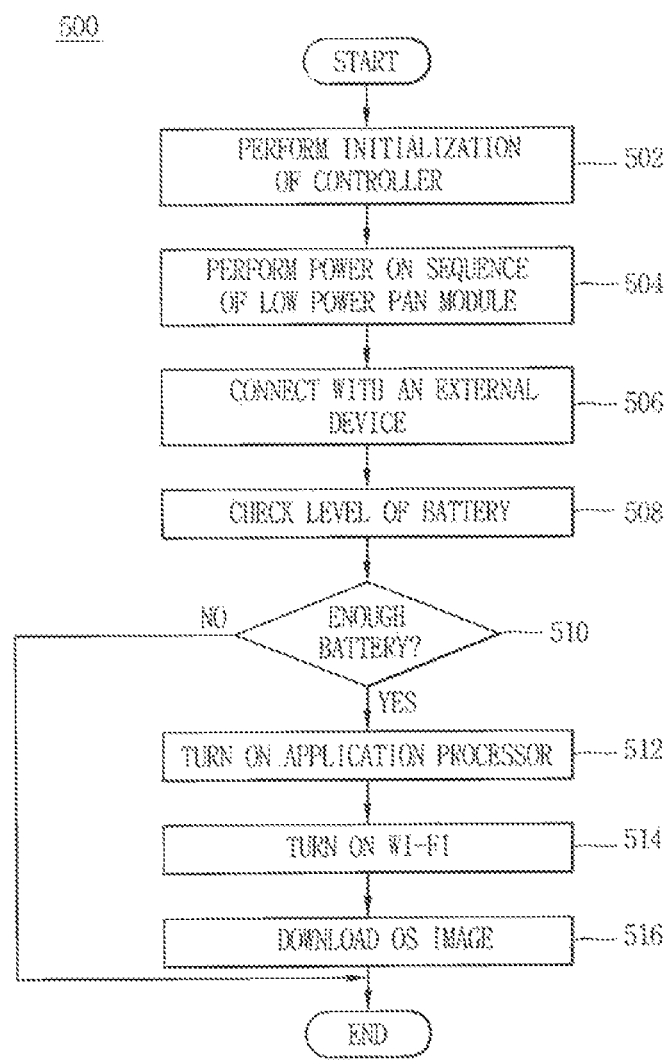
FIG. 5 illustrates a process flow chart of an exemplary method of a mobile device for waking up an application processor of the mobile device, according to one embodiment.

FIG. 5 illustrates a process flow chart 500 of an exemplary method of a mobile device for waking up an application processor of the mobile device, according to one embodiment. In keeping with the previous examples, particular components described with respect to FIG. 2 are referenced as performing the process in FIG. 5. It should be noted that the components that are referred to as performing the process are for illustrative purposes only. In some implementations, other components, or a different combination of components within a system or device, may instead perform the process in FIG. 5.

In operation 502, as illustrated in FIG. 2, the initialization of the controller 208 is performed as the battery 214 (e.g., fully charged) is installed on the mobile device 200. Then, in operation 504, the power on sequence of the low power PAN module 206 is performed. From this on, until the AP 204 is turned on by a request from an external device, the controller 208 as well as the low power PAN module 206 remains in standby mode, thus consuming minimal amount of power from the battery 214. This way, a mobile device (e.g., the mobile device 200) in package can be configured to attune to a wake up signal (e.g., the connection request signal 210 and the AP on request signal 212) from an external device (e.g., the server 102) while consuming minimal amount of power to maintain the monitoring and controlling system and/or device (e.g. the system for waking up AP 202) in standby mode. As the low power PAN module 206 as well as the controller 208 can be maintained using quiescent current from the battery 214, the monitoring and controlling system and/or device may be maintained for many months without any recharging.

When the system for waking up AP 202 is in standby mode in operation 506, the mobile device 200 may connect with the external device when the connection request signal 210 is verified. In operation 508, upon receipt of the AP on request signal 212 from the external device, the level of the battery 214 is checked. If there isn't enough battery required to perform a single task satisfactorily, the mobile device 200 may refrain from acknowledging the external device in response to the AP on request signal 212 and ends the process illustrated in FIG. 5 for the mobile device 200. On the other hand, if there is enough battery in operation 510, the AP 204 of the mobile device 200 is turned on in operation 512.

Then, in operation 514, the AP 204 turns on the Wi-Fi module 136 of FIG. 1 to process data transferred from the external device. The Wi-Fi module 136 (e.g., and/or the Wi-Fi module 134 for the server 102) is selected to transfer large files or large amount of data since Wi-Fi is more equipped to transfer data faster and in farther distance. In operation 516, the OS image 138 is downloaded from the external device to the mobile device 200, thus completing the process. Once the download of the OS image 138 (e.g., or any other task such as remotely running an application) is completed, the AP 204 of the mobile 200 may be turned off and the system for waking up AP 202 may return to the standby mode until there is another wakeup of the AP 204 or the mobile device 200 is in operation.

It is appreciated that the methods disclosed in FIG. 5 may be implemented in a form of a machine-readable medium embodying a set of instructions that, when executed by a machine, cause the machine to perform any of the operations disclosed herein.

Figure 6:
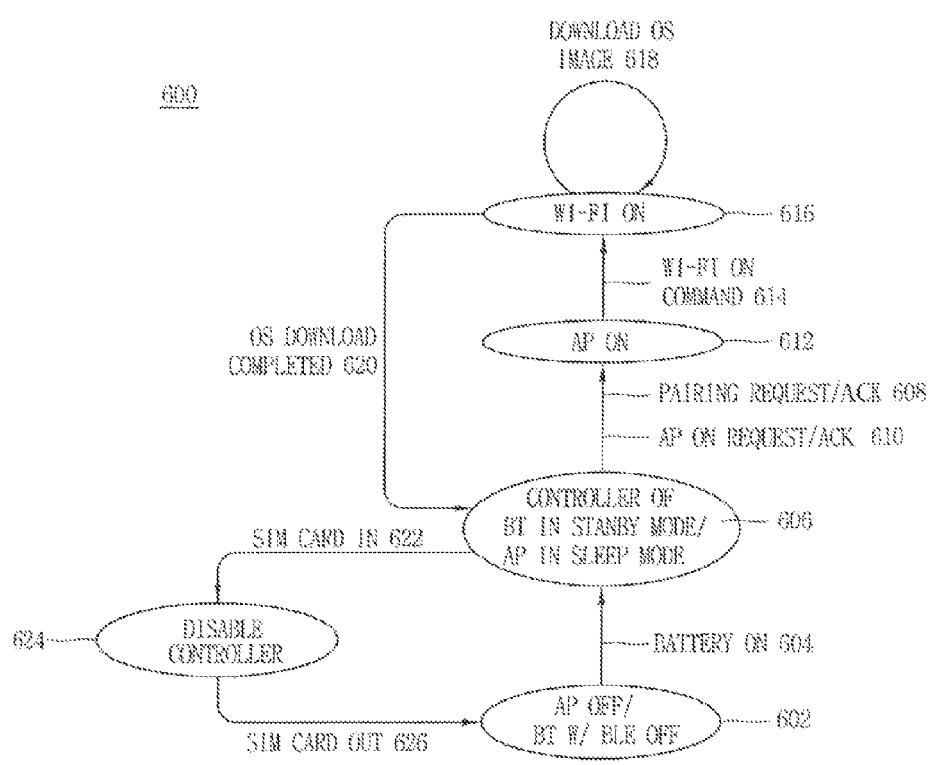
FIG. 6 is a state diagram which illustrates various states of an exemplary mobile device configured for waking up an application processor of the mobile device, according to one embodiment.

FIG. 6 is a state diagram 600 which illustrates various states of an exemplary mobile device configured for waking up an application processor of the mobile device, according to one embodiment. In keeping with the previous examples, particular components in FIG. 1 are referenced to describe the state diagram 600 in FIG. 6. It should be noted that the components that are referred are for illustrative purposes only. In some implementations, other components, or a different combination of components within a system or device, may be used to illustrate the state diagram 600 in FIG. 6.

In FIG. 6, AP OFF/BT W/BLE OFF state 602 is where the mobile device 104A or any one of the mobile devices 104A-N in FIG. 1 is without any power source (e.g., the battery 106). As the battery 106 is inserted to the mobile device 104A, as illustrated in 'battery on' 604 during the packaging process of the mobile device 200, the controller 112 and/or the BT device with BLE feature 124 of the mobile device 104A are switched to the standby mode, where the controller 112 are configured to remain alert for a signal from an external device. During CONTROLLER OF BT W/BLE IN STANDBY MODE/AP IN SLEEP MODE state 606, the AP 108 remains in sleep state, thus drawing minimal amount power from the battery 106. This way, the controller 112 of the BT device with BLE feature can remain in the standby mode (e.g., several months) with just quiescent current supplied from the battery 106.

Then, upon the processing of the pairing request and the AP on request, as in 'pairing request/ack' 608 and 'AP on request/ack' 610, the state of the mobile device 104A is moved to AP ON state 612. In the AP ON state 612, the AP 108 of the mobile device 104A is turned on, and the AP 108 takes over the control of the BT device with BLE feature 124. Then, the AP 108 issues a 'Wi-Fi on command' 614 to turn the Wi-Fi module 136, thus arriving at WI-FI ON state 616. When the mobile device 104A is in the Wi-Fi ON state 616, the download of the OS image 138 from the server 102 is performed, as illustrated in step 'download OS image' 618. Further, as the download of the OS image 138 is completed in 620 ('OS download completed), the state of the mobile device 104A returns to the CONTROLLER OF BT W/BLE IN STANDBY MODE/AP IN SLEEP MODE state 606, where the controller 112 is in the standby mode while the AP 108 is in sleep or deep sleep mode. Then, as the mobile device 104A is brought out from its package and accessed by a user, as 'SIM card in' 622 indicates, the state of the mobile device 104A is transformed to DISABLE CONTROLLER STATE 624, where the controller 112 is disabled in order to prevent the user to temper with the mobile device 200. Further, as the SIM card is brought out as the mobile device 104A is in for service, as indicated in 'SIM card out' 626, the state of the mobile device 104A changes to the AP OFF/BT W/BLE OFF state 602.

In various embodiments, the systems, circuits, devices, and methods described in FIGS. 1-6 may enable remote wake up of an AP of a mobile device. The above-described systems, circuits, devices, and methods may provide more efficient way of waking up the AP of the mobile device as long as the mobile device has enough battery power to operate a system for waking up the AP in standby mode as described earlier. Further, using the remote wake up of the AP of the mobile device, an application of the mobile device may be executed remotely. In addition, data may be transferred from an external device communicatively connected with the mobile device using more powerful communication means. In one exemplary implementation, an upgrade of the OS of multiple mobile devices in packages may be carried out using the systems and processes descried in FIGS. 1-6 such that time and cost invested into the maintenance can be saved. Thus, the various embodiments disclosed in the present disclosure provide more versatile, efficient methods, systems and devices for remotely controlling mobile devices.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A system of a mobile device for waking up an application processor (AP) of the mobile device, the system comprising:
a low power personal area network (PAN) module configured to communicate with an external device for establishing a connection with the external device;
a controller for the low power PAN module configured to process a connection request signal from the external device and to wake up the AP of the mobile device in response to an AP on request signal from the external device when the connection request signal from the external device is verified as valid, wherein the controller is supplied with quiescent current from a battery of the mobile device prior to the wake up of the AP; and
a switch physically coupled to the AP, the low power PAN module and the controller, the switch controllable by the controller to open a connection between the AP and the low power PAN module prior to the wake up of the AP and to close the connection upon the wake up of the AP so that data is communicated directly between the low power PAN module and the AP upon the wake up of the AP.

2. The system of claim 1, further comprising a low dropout regulator (LDR) configured to maintain a voltage supplied to the low power PAN module.

3. The system of claim 1, wherein the low power PAN module comprises a Bluetooth device with a Bluetooth low energy (BLE) feature.

4. A mobile device, comprising:
a battery;
an application processor (AP);
a low power personal area network (PAN) module configured to communicate with an external device for establishing a connection with the external device;
a controller for the low power PAN module configured to process a connection request signal from the external device and to wake up the AP in response to an AP on request signal from the external device when the connection request signal is verified as valid, wherein the controller is supplied with quiescent current from the battery prior to the wake up of the AP; and
a switch physically coupled to the AP, the low power PAN module and the controller, the switch controllable by the controller to open a connection between the AP and the low power PAN module prior to the wake up of the AP and to close the connection upon the wake up of the AP so that data is communicated directly between the low power PAN module and the AP upon the wake up of the AP.

5. The mobile device of claim 4, further comprising:
a low dropout regulator (LDR) configured to maintain a voltage supplied to the low power PAN module; and
a power management integrated circuit (PMIC) configured to control a power supplied to the AP.

6. The mobile device of claim 5, wherein the low power PAN module comprises a Bluetooth device with a Bluetooth low energy (BLE) feature.

7. The mobile device of claim 6, wherein the controller is initialized when the battery is installed to the mobile device, and the controller is further configured to:
perform a power on sequence of the low power PAN module by controlling the LDR via a first general purpose input/output (GPIO) of the controller;
perform a pairing with the external device based on authentication data from the external device forwarded via a second GPIO of the controller;
forward a power on signal to the PMIC to wake up the AP via a third GPIO of the controller in response to the AP on request signal from the external device; and
operate the switch to transfer a control of the Bluetooth device with the BLE feature to the AP.

8. A system, comprising:
a server; and
a plurality of mobile devices, each mobile device comprising:
a battery;
an application processor (AP);
a low power personal area network (PAN) module configured to communicate with the server for establishing a connection with the server;
a controller for the low power PAN module configured to process a connection request signal from the server and to wake up the AP of said each mobile device in response to an AP on request signal from the server when the connection request signal from the server is verified as valid, wherein the controller is supplied with quiescent current from the battery of said each mobile device prior to the wake up of the AP; and a switch physically coupled to the AP, the low power PAN module and the controller, the switch controllable by the controller to open a connection between the AP and the low power PAN module prior to the wake up of the AP and to close the connection upon the wake up of the AP so that data is communicated directly between the low power PAN module and the AP upon the wake up of the AP.

9. The system of claim 8, wherein the server comprises:
a PAN module; and
a processor configured to generate the connection request signal and the AP on request signal.

10. The system of claim 9, wherein the PAN module of the server comprises a Bluetooth device, and the low power PAN module of said each mobile device comprises a Bluetooth device with a Bluetooth low energy (BLE) feature.

11. The system of claim 10, wherein the server further comprises a database storing an address of the Bluetooth device with the BLE feature in said each mobile device and a personal identification number (PIN) code designated for said each mobile device.

12. The system of claim 11, wherein a pairing of the server and said each mobile device is performed based on the address of the Bluetooth device with the BLE feature and the PIN code designated for said each mobile device.

13. The system of claim 12, wherein the server is configured to request the connection with the server to said each mobile device according to a particular profile of the server, and said each mobile device is configured to accept the request.

14. The system of claim 13, wherein the server and said each mobile device are configured to implement a protocol for the wake up of the AP.

15. The system of claim 14, wherein said each mobile device is configured to perform the wake up of the AP upon receipt of the AP on request signal.

16. The system of claim 15, wherein the controller of said each mobile device is configured to measure a level of the battery upon receipt of the AP on request signal, and the wake up of the AP is performed when the level of the battery is higher than a threshold level.

17. The system of claim 16, wherein the server further comprises a first Wi-Fi module and said each mobile device comprises a second Wi-Fi module.

18. The system of claim 17, wherein a download of an OS image stored in the server to said each mobile device is performed via the first Wi-Fi module and the second Wi-Fi module.

19. The system of claim 18, wherein the controller for the low power PAN module is disabled when the download of the OS image is completed.

* * * * *